United States Patent [19]
Ohyama

[11] Patent Number: 5,689,108
[45] Date of Patent: Nov. 18, 1997

[54] INTEGRATED OPTICAL PICK-UP

[75] Inventor: Minoru Ohyama, Yokohama, Japan

[73] Assignee: Victor Company of Japan, Ltd., Tokyo, Japan

[21] Appl. No.: 653,629

[22] Filed: May 24, 1996

[30]     Foreign Application Priority Data

May 27, 1995  [JP]  Japan .................................. 7-152458

[51] Int. Cl.$^6$ ...................................................... H01J 5/02
[52] U.S. Cl. ...................................................... 250/239
[58] Field of Search .................................. 250/239, 216, 250/201.5, 556, 234–236; 359/17, 554–558; 235/457, 462, 472; 385/10, 132; 369/44.14–44.26

[56]             References Cited

U.S. PATENT DOCUMENTS 5,285,062  2/1994  Lee .......................................... 250/239
5,374,819  12/1994  Kim et al. ............................... 250/201.5

FOREIGN PATENT DOCUMENTS 5-314537  11/1983  Japan .
5-307760  11/1993  Japan .
6-4894    1/1994   Japan .

*Primary Examiner*—Que Le
*Attorney, Agent, or Firm*—Michael N. Meller

[57]             ABSTRACT

A light beam generated by a laser diode travels straight through a holographic beam splitter and other optical elements without undergoing any optical modifications up to an information storage disk (disc), and a return beam reflected on the disk (disc) surface is diffracted and divided into two beams by the holographic beam splitter. The divided two beams are reflected by mirrors respectively and irradiate photo-detectors respectively. A monitoring beam is generated at the back of the laser diode, and is reflected by an additional mirror and irradiates an additional photodetector.

11 Claims, 5 Drawing Sheets

INTEGRATED OPTICAL PICK-UP

BACKGROUND OF THE INVENTION

1. Field of the Invention

The present invention relates to an optical pick-up for recording and/or reproducing a signal on or from an optical information disk (disc), such as CD (Compact Disc), MD (Mini Disc), and LD (Laser disc) and more particularly to an improved small size and light weight optical pick-up.

2. Description of the Related Arts

Generally, many kinds of optical pick-ups for recording and/or reproducing a signal on or from an optical information disk (disc), such as CD, MD, and LD are already known. Some of the conventional technologies are explained below.

As disclosed in the Japanese Patent Laid-Open Publication, 5-314537, there is proposed an integrated optical pick-up integrating an optical devices such as a laser diode, an optical circuit, and an optical detector in a block including an optical prism.

As disclosed in the Japanese Patent Laid-Open Publication, 6-4894, there is proposed an integrated optical pick-up molding a lens, and a prism in a body of transparent material.

As disclosed in the Japanese Patent Laid-Open Publication, 5-307760, there is proposed an integrated optical pick-up formed with a photo detector on a semiconductor substrate on which a laser diode is mounted on the substrate, and a 45-degree-mirror is further formed by chemical etching.

As explained the above, many attempts for obtaining a small size, light weight, and low-priced optical pick-up by integrating optical functions on a semiconductor substrate or forming as a plastic module are widely made.

Following are required for an optical pick-up especially for an integrated type optical pick-up or an optical pick-up module.

Generally, a plastic mold is inferior to a glass mold in its dimensional accuracy. As the number of boundaries between the plastic and air increases, wavefront aberration cumlates. For a given flatness of a surface in an optical path, a reflected light has bigger wavefront aberration than a path-through light has.

In general, an optical system of an optical disk (disc) system has aberrations. Aberrations of an optical system which is in a path of an incidental light on a disk (disc) surface is required to be less than a diffraction limit of a beam spot of a laser diode. This leads that RMS (root mean square) of the aberrations of the optical system should be less than $0.05\gamma$ ($\gamma$ is a wavelength of the laser). This means that the optical system which is in the path of the incidental light is required to have very small wavefront aberrations. On the other hand, as a reproduced signal from the object disk (disc) is a sum of the intensity of total flux of a reflected light, aberrations of an optical system which is in a path of reflected light from a disk (disc) is allowed to be more than the diffraction limit.

A photodetector is generally formed on an Si wafer by a precision semiconductor process technology. For this reason, a laser chip can be positioned precisely on the substrate by utilizing positioning marks provided for the mask alignment. As a conventional laser diode projects a beam parallel to its die bonding surface, a mirror is required for changing a direction of light path in order to lead the return beam (reflected from the disk (disc) surface) to the photo detector.

In the Japanese Patent Laid-Open Publication 5-314537, optical paths of the incidental light including an objective lens, are constructed by surfaces of an optical module. Generally, a plastic package has poor dimensional accuracy, and it is difficult to obtain a desirable result using this optical system.

In the Japanese Patent Laid-Open Publication, 6-4894, optical components of optical pick-up are simply molded in a transparent material. This optical system has the same problems of poor dimensional accuracy.

In the Japanese Patent Laid-Open Publication, 5-307760, an optical system has a 45-degree-mirror constructed by etching on an Si substrate. This conventional technology has such problems as difficulties in keeping conditions of etching, in controlling crystallographic axis of Si substrate, in keeping high production rate, and difficulties in simplifying production facilities.

SUMMARY OF THE INVENTION

The present invention has been made in order to solve the above-mentioned problems, and an object of this invention is to provide an optical pick-up having a solid body and both high precision and high productivity. Another object of the present invention is to provide an optical pick-up requiring a simple production process and precise components positioning. Further object of the present invention is to provide a low-cost optical pick-up. Further and another object of the present invention is to simplify production facilities.

A feature of the present invention is to provide a mirror for changing a direction of light path only in the return beam path. Another feature of the present invention is to provide a laser diode chip by bonding on a photodetector substrate. Further feature of the present invention is to mold the above components by transparent plastic, utilizing a part of the mold as a mirror for changing a light path.

DETAILED DESCRIPTION OF THE PREFERRED EMBODIMENT

The present invention will now be described in detail with respect to the accompanying drawings.

[First Embodiment]

Figure 2:
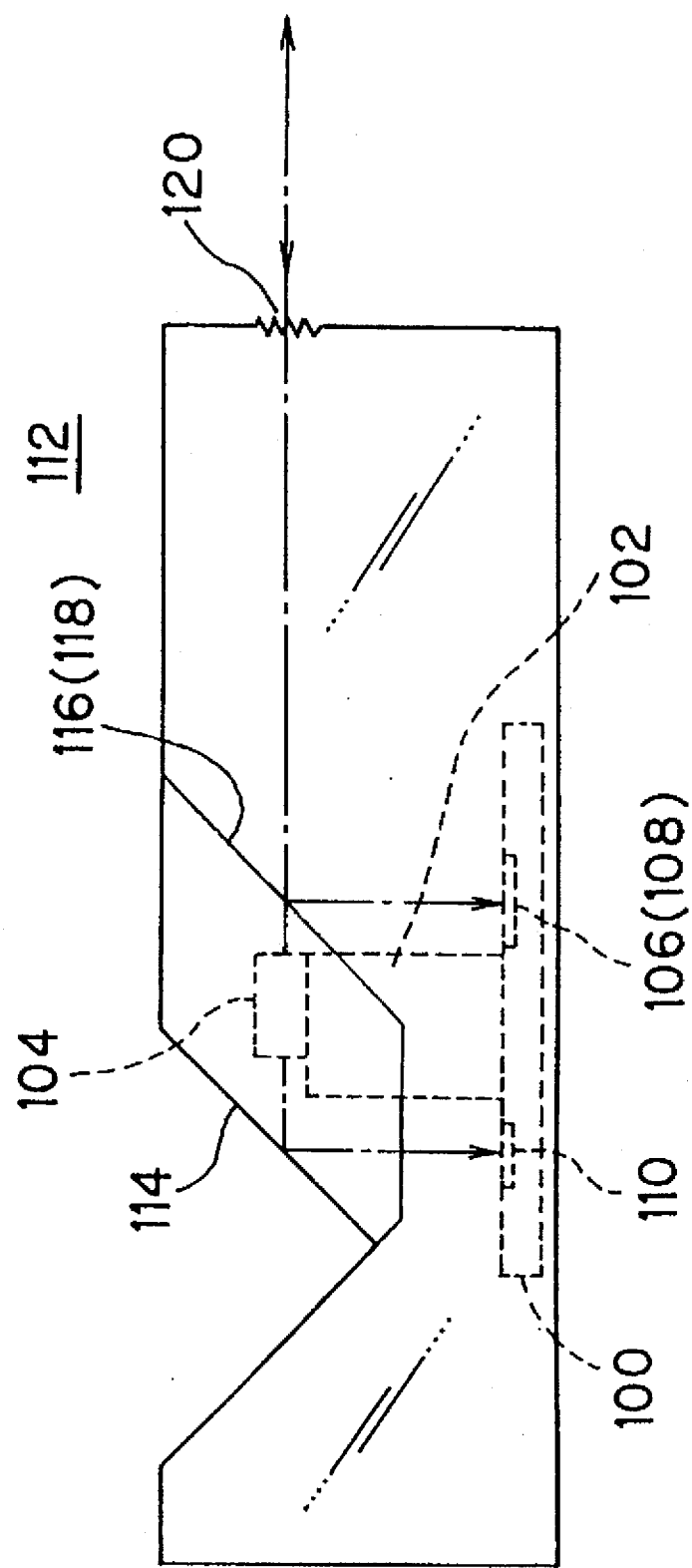
FIG. 2 shows a side view of the main components of the first embodiment.
Figure 3:
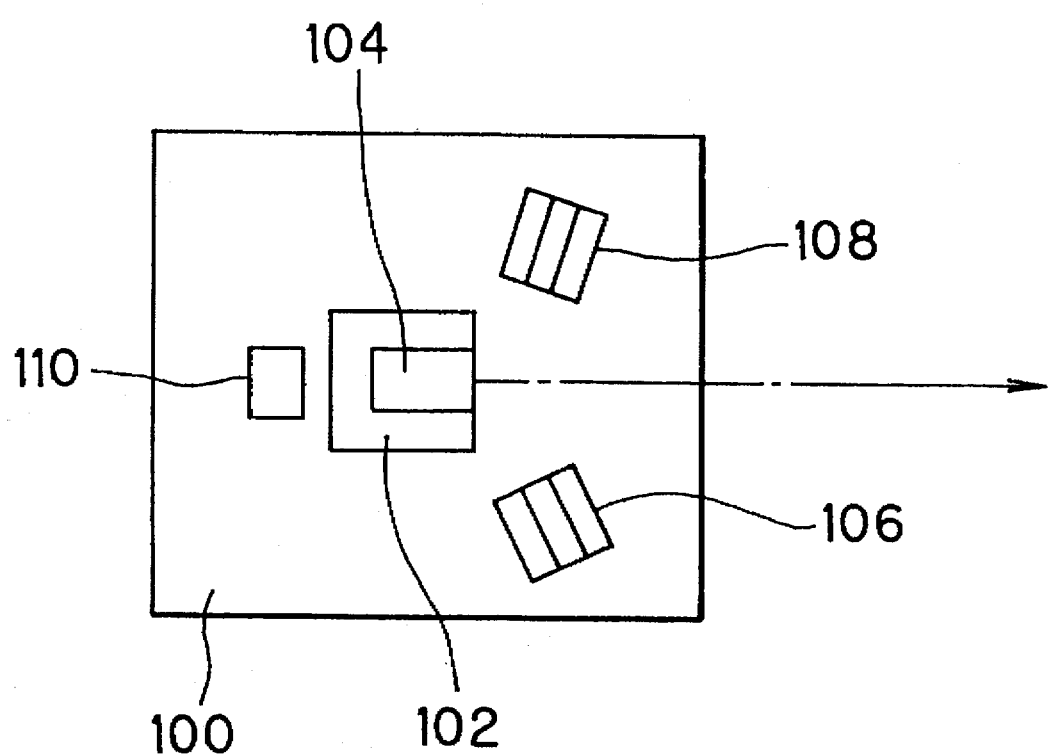
FIG. 3 shows a plan view of the main part of the first embodiment.

First embodiment will be explained referring to FIGS. 1 through 3.

Figure 1:
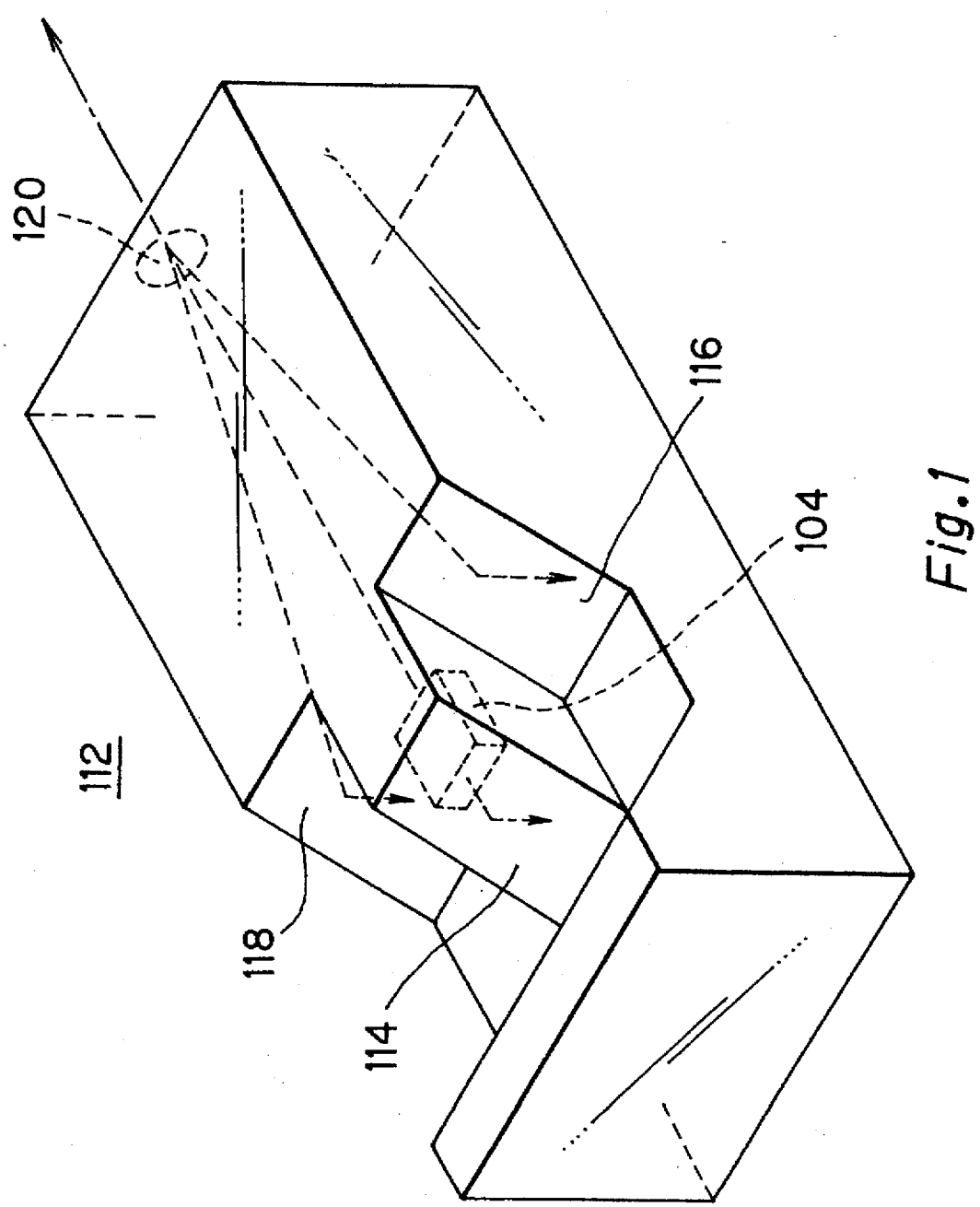
FIG. 1 shows a perspective view of the first embodiment of the present invention.

FIG. 1 shows a perspective view of the first embodiment of the present invention. FIG. 2 shows a side view of the first embodiment. FIG. 3 shows a plan view of the first embodiment which is a substrate composed of an OEIC (opt-electronic integrated circuit). A substrate 100 is a semiconductor material such as Si, and has a subsidiary chip 102 approximately on its center. A laser diode 104 is bonded on the top of the subsidiary chip 102. There are photodetectors 106 and 108 on both side of the subsidiary chip 102. An additional photodetector 110 is formed on the substrate and behind of the laser diode 104.

Other components are molded in a mold 112 made of plastic. The mold 112 has an additional mirror 114 at the back of the laser diode 104 by forming a slope. The other slopes 116 and 118 are formed on both sides of the additional mirror 114, which act as mirrors for detecting return beams. At a laser beam projecting plane of the mold 112, a holographic beam splitter 120 is formed.

The photodetector 106 is divided into three parts for detecting a tracking error. A photodetector 108 is similar to the photodetector 106.

Reflective mirrors 116, and 118 are formed at 45 degree to the return beams respectively.

The reflective additional mirror 114 is formed at 45 degree to a monitoring light beam.

The return beam reflected by the disk (disc) is partly diffracted into two beams, and these two beams are reflected by the mirrors 116 and 118 respectively and irradiate the photodetectors 106 and 108 respectively. The monitoring beam is reflected by the additional mirror 114 and irradiates the additional photodetector 110.

Functions of the first embodiment will be explained in the following.

A light beam generated by the laser diode 104 travels straight through the holographic beam splitter 120 and the other optical elements such as grating (not shown) to the disk (disc) surface. This incident light beam is reflected on the disk (disc) surface, and the resultant return beam is diffracted and divided into two beams by the holographic beam splitter 120. The divided two beams are reflected by the mirrors 116 and 118 respectively, and irradiate the photodetectors 106 and 108 respectively. The monitoring beam is generated at the back of the laser diode 104, and is reflected by the additional mirror 114 and irradiates the additional photo-detector 110.

As explained the above, the generated light beam undergoes no optical modifications until reaching to the disk surface. Only the return beam from the disk (disc) surface is diffracted by the holographic beam splitter 120 and reflected by the mirrors 116 and 118 respectively. Thus, the optical elements such as the mirrors 116 and 118 for changing directions of light paths and the holographic beam splitter 120 for diffraction are only in the path of the return beam. The additional mirror 114 is used merely for detecting the power of the laser diode 104. Accordingly, the additional mirror 114 and the mirrors 116 and 118 are allowed to have rough accuracy, and provided by forming slopes which are about 45 degree to the substrate 100. Therefore, the mold 112 has a simple shape, and is easy to produce.

The light beam of the laser diode 104 is projected out of a plane of the mold 112 including the holographic beam splitter 120. The shift of the light axis of the projected light can be reduced by forming the plane being perpendicular to the projected light.

[Second Embodiment]

Second embodiment will be explained referring to FIGS. 4 and 5.

Figure 4:
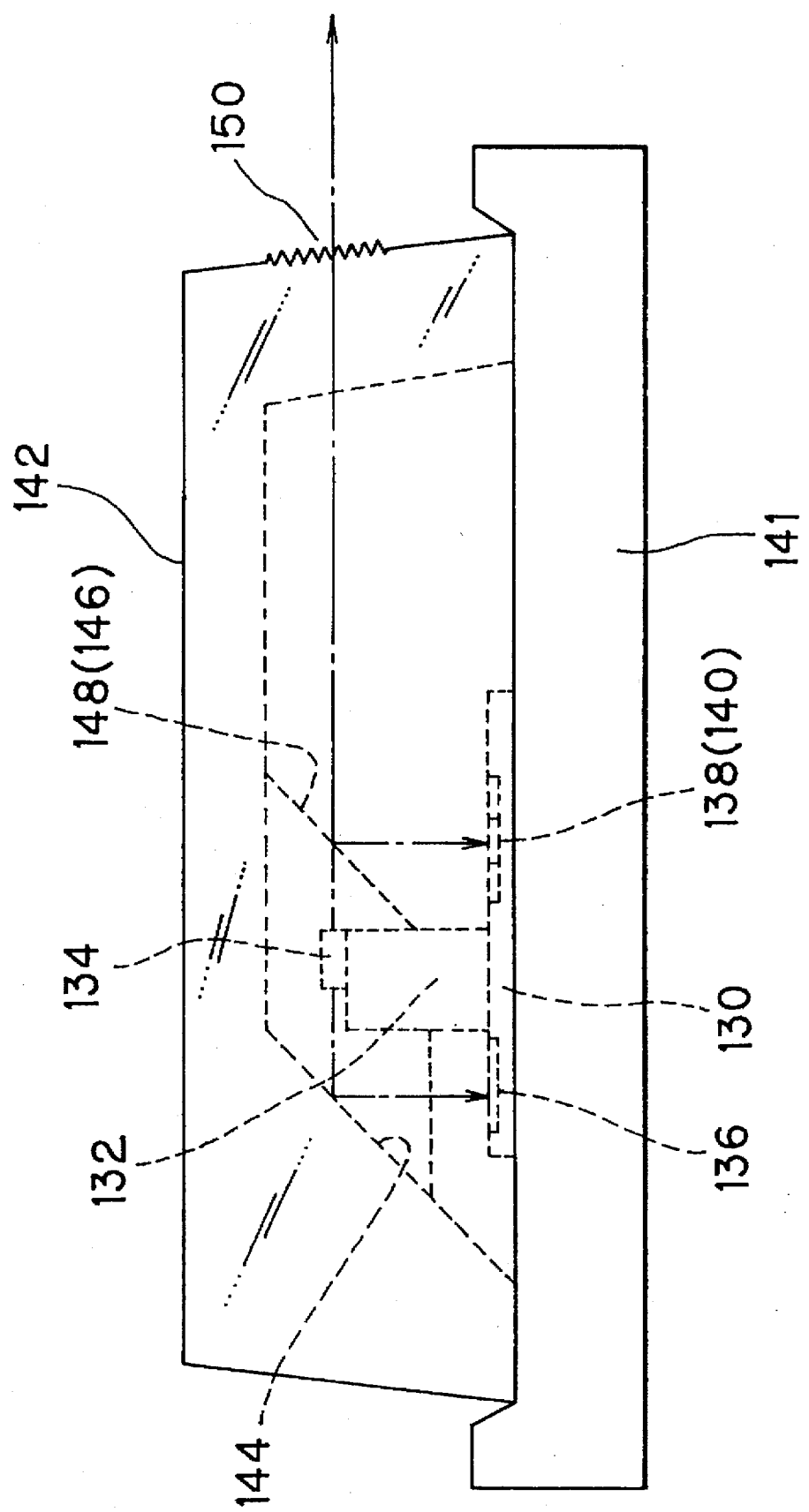
FIG. 4 shows a side view of the main components of the second embodiment of the present invention.
Figure 5:
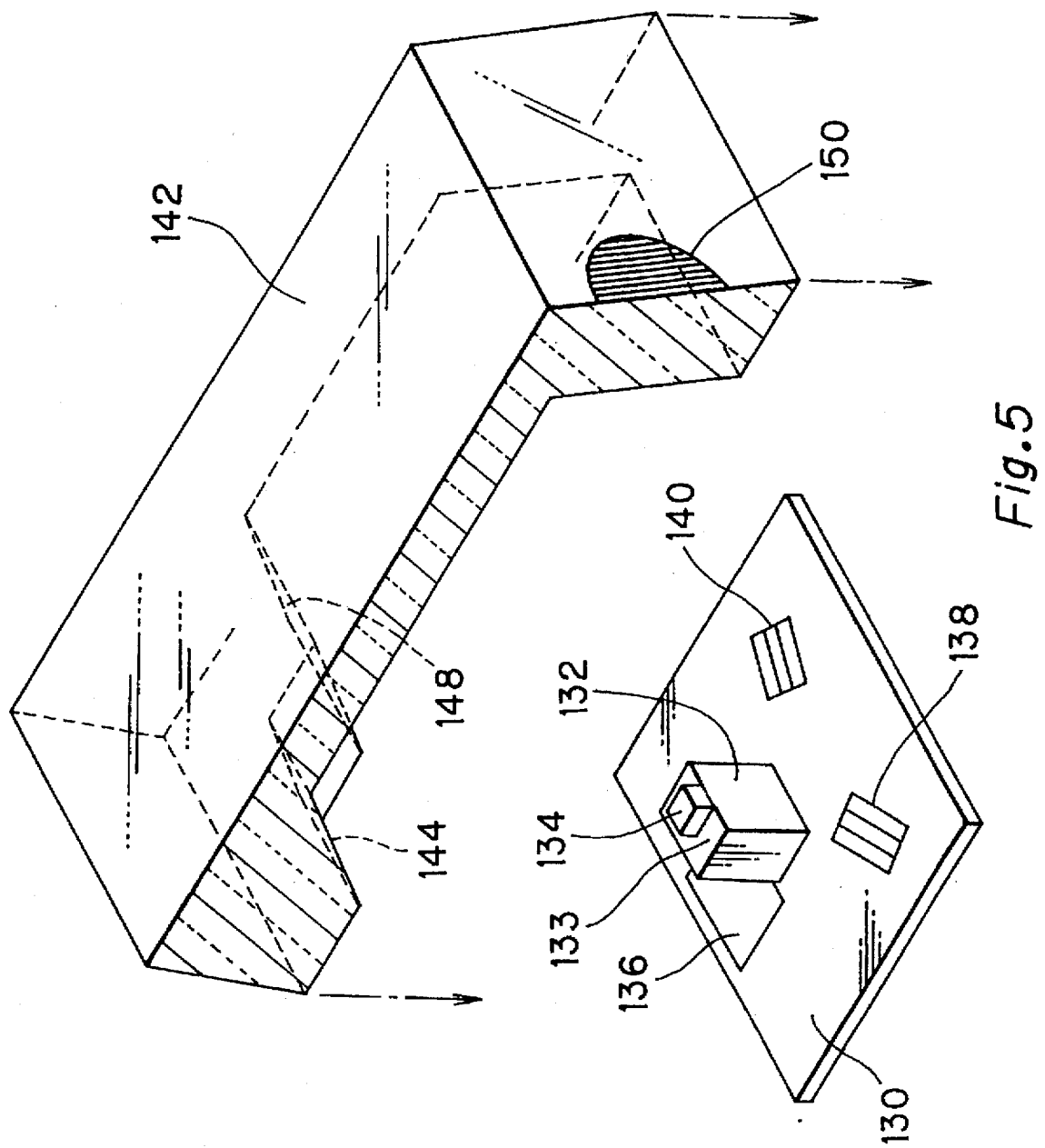
FIG. 5 shows a partially cutaway view of the main components of the second embodiment.

FIG. 4 shows a side view of the main components of the second embodiment. FIG. 5 shows a partially cutaway view of the main components of the second embodiment.

In this embodiment, a body 142 which may be made of plastic has a cavity therein and an additional mirror 144 and mirrors 146, and 148 which are inverted forms of the mirrors 114, 116, and 118 in other words, they are formed on an inside wall of the cavity of the body 142. A subsidiary chip 132, an additional photodetector 136, and photodetectors 138, 140 are provided on a substrate 130. A laser diode 134 is provided on the subsidiary chip 132. The substrate 130 with the components mentioned above is mounted on a base 141 and covered and sealed by the body 142. A space between the base 141 and the body 142 is filled with an inert gas such as nitrogen.

Inside of the body 142, the first, second and third mirrors are formed on the inside wall of the body 142. A holographic beam splitter 150 is formed on a plane of the body 142 where a laser beam is projected from. The features of the second embodiment are basically same to those of the first embodiment.

A light beam generated by the laser diode 134 travels straight through the holographic beam splitter 150 and the other optical elements (not shown) to the disk (disc) surface. This incident light beam is reflected on the disk (disc) surface, and a resultant return beam is diffracted and divided into two beams by the holographic beam splitter 150. The divided two beams are reflected by the mirrors 146 and 148 respectively, and irradiate the photodetectors 138 and 140 respectively. The monitoring beam is generated at the back of the laser diode 134, and is reflected by the additional mirror 144 and irradiates the additional photodetector 136.

In this embodiment, as the body 142 and the substrate 130 are separated each other before assembly, relative positions of them can be adjusted.

[Third Embodiment]

In the first or second embodiment, other electronic devices than the photodetectors 136, 138, 140, which are required for the optical pick-up, such as a current/voltage converter, an amplifier, an operational circuit which may be formed produced monolithically on the substrate 130.

[Fourth Embodiment]

In the first through third embodiment, as the fanning out of a laser diode is elliptic and broad in profile, thus the beam for monitoring is lost partly.

[Fifth Embodiment]

In the aforementioned embodiment, optical components including the substrate and the laser diode are sealed in the plastic mold, but they are may be simply fixed by transparent material or encased in a molded glass case.

According to the aforementioned embodiments of the present invention, the following are disclosed.

The generated light beam undergoes no optical modifications until reaching to the disk (disc) surface. Only the return beam is diffracted by the holographic beam splitter (120, 150) and reflected by the mirrors (116, 118, 146, 148). Thus, the optical elements such as the mirrors (116, 118, 146, 148) for changing directions of light paths and the holographic beam splitter (120, 150) for diffraction are only in the path of return beam. The additional mirror (114, 144) is used merely for monitoring the power of the laser diode (104, 134). Accordingly, the additional mirror (114, 144) and the mirrors (116, 118, 146, 148) are allowed to have rough accuracy, and produced by forming slopes which are about 45 degree to the substrate (100, 130). Therefore, the mold (112, 142) can be a simple shape, and is easy to produce. Hence, it is possible to produce small size, light weight and low-cost optical pick-up.

What is claimed is:

1. An optical pick-up comprising:
   a laser diode for generating a light beam said light beam reaching to an information storage means and reflected thereby to form a return beam,
   a mirror for directing said return beam;
   diffraction means for diffracting said return beam;
   photo detecting means for detecting said return beam diffracted by said diffraction means and directed by said mirror to said photodetecting means;

said mirror being provided only in a path of said return beam, said laser diode being provided on a substrate on which said photo detecting means is provided;

transparent plastic means for covering and sealing said substrate, said photo detecting means, and said laser diode, and said mirror being provided on said transparent plastic means.

2. An optical pick-up in accordance with claim 1, wherein said photo detecting means for detecting said return beam is monolithically formed on said substrate, and an additional mirror is formed on said transparent plastic for monitoring a power of said laser diode.

3. An optical pick-up in accordance with claim 1, wherein said transparent plastic means has a plane from which said light beam is projected, and said plane is formed to be perpendicular to said light beam.

4. An optical pick-up in accordance with claim 2, wherein said transparent plastic means has a plane from which said light beam is projected, and said plane is formed to be perpendicular to said light beam.

5. An optical pick-up in accordance with claim 1, wherein a plane of said substrate and light axis of said light beam are parallel with each other.

6. An optical pick-up in accordance with claim 2, wherein said substrate is extending parallel with a light axis of said light beam.

7. An optical pick-up in accordance with claim 3, wherein said substrate is extending parallel with a light axis of said light beam.

8. An optical pick-up in accordance with claim 1, wherein said diffraction means is formed on a plane on said transparent plastic means and said light beam generated by said laser diode is projected from said plane.

9. An optical pick-up in accordance with claim 2, wherein said diffraction means is formed on a plane on said transparent plastic means and said light beam generated by said laser diode is projected from said plane.

10. An optical pick-up in accordance with claim 3, wherein said diffraction means is formed on a plane on said transparent plastic means and said light beam generated by said laser diode is projected from said plane.

11. An optical pick-up in accordance with claim 5, wherein said diffraction means is formed on a plane on said transparent plastic means and said light beam generated by said laser diode is projected from said plane.

* * * * *